United States Patent
Zerza et al.

(10) Patent No.: US 7,148,977 B2
(45) Date of Patent: Dec. 12, 2006

(54) CONSUMABLE AVAILABILITY WITH PRINT PREVIEW

(75) Inventors: Wendy L. Zerza, Boise, ID (US); Vincent C. Skurdal, Boise, ID (US); Boyd Wilkes, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 10/266,413

(22) Filed: Oct. 8, 2002

(65) Prior Publication Data

US 2004/0066525 A1   Apr. 8, 2004

(51) Int. Cl.
 *G06F 15/00* (2006.01)
 *G06K 1/00* (2006.01)
(52) U.S. Cl. ..................... 358/1.14; 715/527
(58) Field of Classification Search ............... 358/1.14, 358/1.15, 2.1, 518, 1.11; 715/527, 528; 382/163; 710/16; 399/8, 24, 27, 28, 54
See application file for complete search history.

(56) References Cited

U.S. PATENT DOCUMENTS

| | | | |
|---|---|---|---|
| 5,229,814 A * | 7/1993 | Hube et al. | 399/14 |
| 6,102,508 A | 8/2000 | Cowger | |
| 6,108,009 A * | 8/2000 | Nishikawa | 345/590 |
| 6,116,715 A | 9/2000 | Lefebvre et al. | |
| 6,154,619 A | 11/2000 | Boockholdt et al. | |
| 6,527,366 B1 * | 3/2003 | Byers et al. | 347/43 |
| 6,608,978 B1 * | 8/2003 | Robertson et al. | 399/82 |
| 2002/0071689 A1 * | 6/2002 | Miyamoto | 399/53 |
| 2002/0089686 A1 * | 7/2002 | Kitahara et al. | 358/1.14 |
| 2002/0105668 A1 * | 8/2002 | Lilland et al. | 358/1.14 |

FOREIGN PATENT DOCUMENTS

EP   0983855 A2   3/2000
JP   2001293911 A *  10/2001

* cited by examiner

*Primary Examiner*—Kimberly Williams
*Assistant Examiner*—Dillon Murphy (57) ABSTRACT

Apparatus, systems and methods for print previewing are provided. One method includes providing a print preview that reflects a consumable availability status and optionally proceeding with a print job.

34 Claims, 6 Drawing Sheets

---

510
EVALUATING A CONSUMABLE AVAILABILITY STATUS

520
EVALUATING A PRINTER SETTING STATUS

530
PROVIDING A PRINT PREVIEW UPON DETECTING ONE OR MORE CONSUMABLES IS IN A INSUFFICIENT SUPPLY

CONSUMABLE AVAILABILITY WITH PRINT PREVIEW

FIELD

The present invention relates to printer technologies, and in particular to consumable availability with print preview.

BACKGROUND

There are many types of printing mechanisms. Different types of printing mechanisms are useful for different types of printing jobs. For example, inkjet printing is capable of producing high-quality color photographs from digital images. One type of inkjet printing mechanisms use cartridges, often called "pens," which eject drops of liquid colorant, referred to generally herein as "ink," onto a page. Each pen has a printhead formed with very small nozzles through which the ink drops are fired. To print an image, the printhead is propelled back and forth across the page, ejecting drops of ink in a desired pattern as it moves. The particular ink ejection mechanism within the printhead can include a piezo-electric or a thermal printhead mechanism. Other types of inkjet printers use individual pens rather than cartridges. Generally, four colors (black, cyan, magenta and yellow) need to be mixed to form an image. Problems can occur when one or more of the four colors becomes unavailable. One of the four colors can become unavailable for any number of reasons including simply running out of the color.

When colors become unavailable, consumable resources can be wasted. There are many consumable resources or consumables associated with printing a job. Ink, liquid toner or dry toner is one such resource. Inks, liquid toners or dry toners vary in cost. Another consumable resource or consumable is the media or paper on which a job is printed. The cost of printing media can be very little or can be in excess of $1.00 per sheet of media. Ordinary printing paper, for example, is inexpensive. However, special media can be used for printing high-quality photographs. The cost of photo-grade media can be very high.

Sometimes waste can occur due to the fact that printing is allowed to continue when doing so will waste a consumable or not accurately reflect a user's expectations. For example, when the ink or toner for one or more colors is in an insufficient supply, e.g. low or no yellow, the finished print job will have an appearance that will be unacceptable in view of what was anticipated. If the finished print job is unacceptable, then consumables such as ink and paper will have been consumed wastefully and the print process will have to be repeated.

DETAILED DESCRIPTION

The following description and the drawings are provided to illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of various embodiments of the invention is defined only by the appended claims.

The functions described herein are implemented in software in one embodiment, where the software comprises computer executable instructions stored on computer readable media such as memory or other type of storage devices. The term "computer readable media" is also used to represent carrier waves on which the software is transmitted. Further, such functions correspond to modules, which are software, hardware, firmware of any combination thereof. Multiple functions are performed in one or more modules as desired, and the embodiments described are merely examples.

Figure 1:
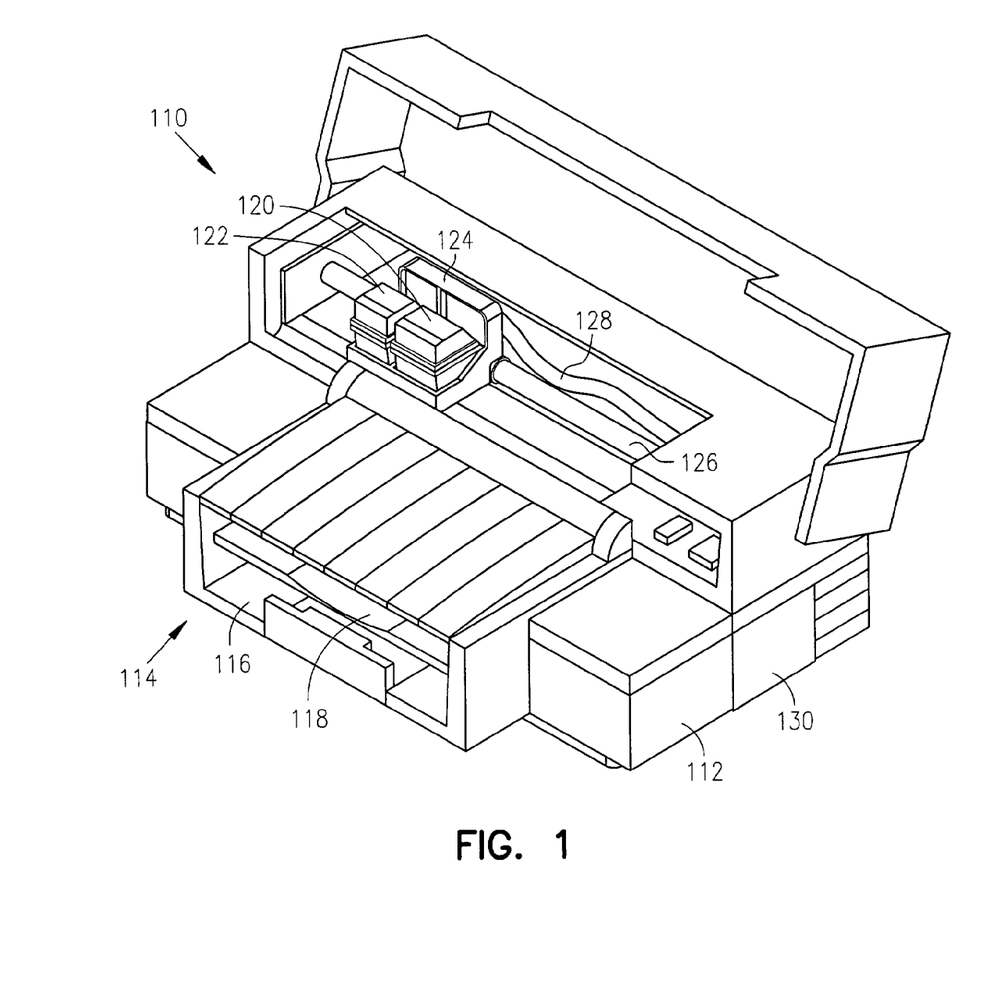
FIG. 1 is a perspective view of a printing apparatus according to one embodiment of the invention.

FIG. 1 illustrates a printing device 110 according to an embodiment of the invention. The embodiment of FIG. 1 illustrates an inkjet printer 110, which may be used in an office or home environment for business reports, correspondence, desktop publishing, pictures and the like. However, the invention is not so limited and can include a laser jet printer or other printers implementing the aspects of the present invention. In the embodiment of FIG. 1, the printer 110 includes a chassis 112 and a print media handling system 114 for supplying one or more print media, such as a sheet of paper, business card, envelope, or high-quality photo paper to the printer 110. As one of ordinary skill in the art will understand upon reading this disclosure, the print media can include any type of material suitable for receiving an image, such as paper cardstock, transparencies, mylar, foils, among others. In the embodiment of FIG. 1, the print medium handling system 114 includes a feed tray 116, an output tray 118, and a series of rollers (not shown) for delivering sheets of print media from the feed tray 116 into position for receiving ink from a plurality of inkjet cartridges 120, 122. In the embodiment of FIG. 1, inkjet cartridge 120 is a multi-color ink cartridge and inkjet cartridge 122 is a black monochrome ink cartridge. As noted above, ink cartridges are a type of consumable.

As shown in the embodiment of FIG. 1, the ink cartridges 120, 122 are transported by a carriage 124. The carriage 124 can be driven along a guide rod 126 by a drive belt/pulley and motor arrangement (not shown). As one of ordinary skill in the art will appreciate, in other printers the ink cartridges are dispensed by other mechanisms. The invention is not so limited.

In the embodiment of FIG. 1, the cartridges 120, 122 selectively deposit one or more ink droplets on a sheet of paper or other print media in accordance with instructions received via a conductor strip 128 from a printer controller 130 which can be located within chassis 112. The controller 130 receives a set of print instructions from a print driver (e.g. element 208 illustrated in FIG. 2. The print driver can reside in a computing device coupled to the printer 110 via a network or the print driver can reside in the printer itself as in the case of a stand alone printing device, e.g. a photo printer kiosk or standalone appliance. As discussed in more detail below, a display can be associated with the printer 110 as suitable to display visual information to an operator. As such a display is one form of user interface to the printer 110.

Figure 2:
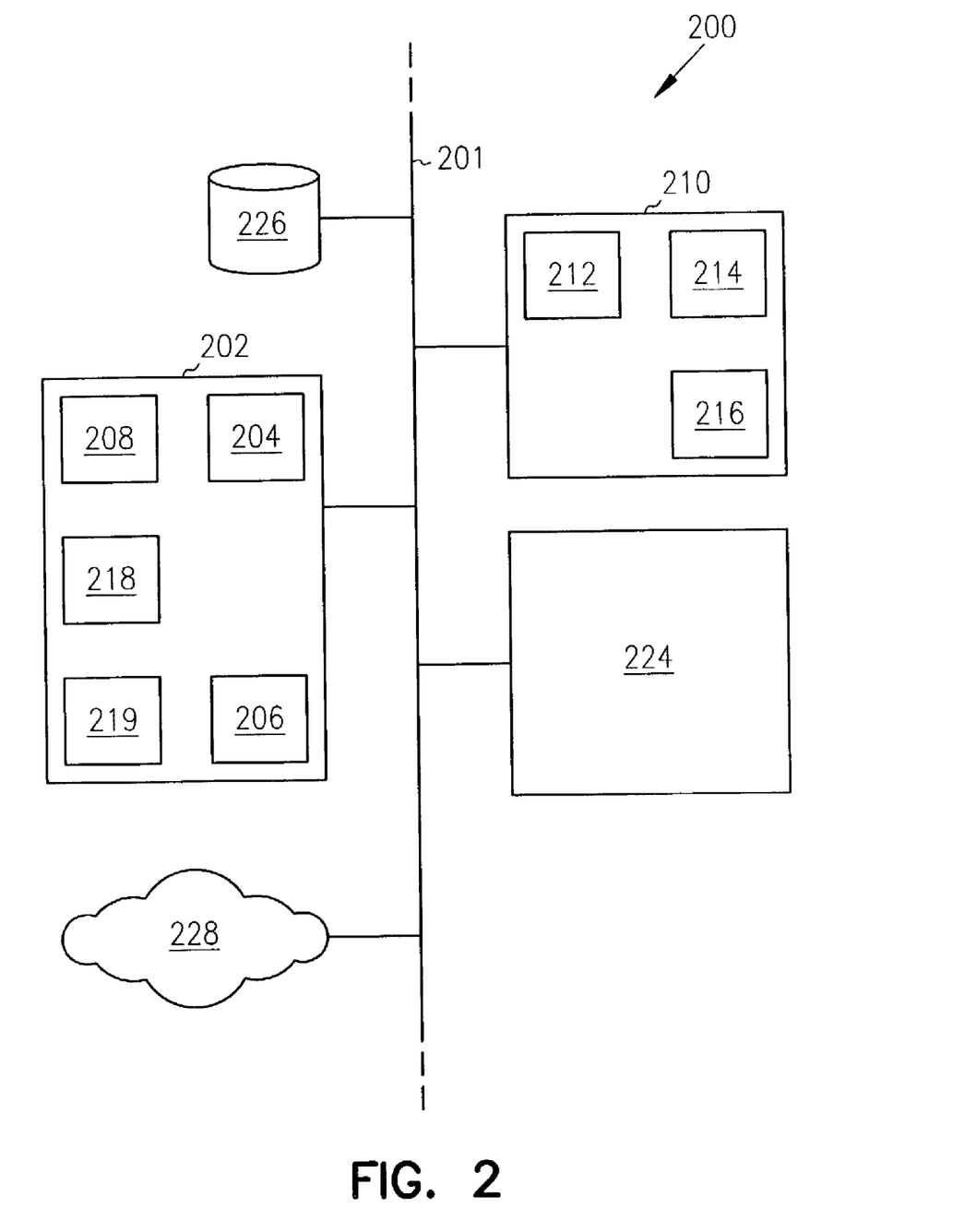
FIG. 2 illustrates a system according to an embodiment of the invention.

FIG. 2 illustrates a system 200 according to an embodiment of the invention. As shown in FIG. 2, the system 200 includes a remote terminal 202. In various embodiments, the remote terminal 202 can include a desktop computer, a laptop computer, a workstation, or other host computer. The remote terminal 202 can include a display 219. The remote terminal 202 also can include one or more processors 204 and one or more memory devices 206 suitable for running software and/or application modules thereon. In the embodiment shown in FIG. 2, the remote terminal includes a printer driver 208. As one of ordinary skill in the art will understand upon reading this description, a printer driver 208 is operable to create an instruction set for a print job which can be sent to a printing engine for rendering an image. Printer driver 208 includes any printer driver suitable for carrying out the aspects of the present invention. That is, the printer driver 208 can take applications running on remote terminal 202 and transform them into a print job.

In various embodiments of the present invention, the printer driver outputs an instruction set in Page Description Language. PDL is a device independent, high level language for instructing the printing engine of a printer to print text and graphics on a page. The two major languages are Adobe's Postscript and Hewlett-Packard's PCL (print control language). PDL is one instruction set format, however, the invention is not so limited and other printer instruction set formats such as a simplified PDL, a complex display list, a display list, a PDL single image, and a video ready data (VRD) are considered within the scope of the present invention.

As shown in FIG. 2, remote terminal 202 is connected to a printer 210 within system 200. Printer 210 includes a printing engine 212, or printer raster image processor 212. Printer 210 can include one or more processors 214 and one or more memory devices 216 suitable for running software and/or application modules thereon. As one of ordinary skill in the art will understand upon reading this description, the software and/or application modules include any software and/or application modules suitable for carrying out various aspects of the present invention.

System 200 includes a network 201 having data links. Network 201 can include any number of network types including, but not limited to a Local Area Network (LAN), a Wide Area Network (WAN), among others. Likewise, data links can include any combination of direct wired and wireless connections, including but not limited to electrical, optical and radio frequency (RF) connections.

In some embodiments, remote terminal 202 is connected to printer via an external RIP (raster image processor) (not shown). That is, an RIP which is external to the printer 210. As one of ordinary skill in the art will appreciate an RIP can include one or more processors and one or more memory devices suitable for running software and/or application modules thereon. In the embodiment of FIG. 2, a host based RIP 218 is illustrated residing on remote terminal 202.

As stated above, the software and/or application modules include any software and/or application modules suitable for carrying out various aspects of the present invention. Such software and/or application modules can be resident in one location or in several and even many locations, such as in a distributed computing environment, throughout the system 200.

Further, as shown in the embodiment of FIG. 2, system 200 can include other peripheral devices 224, storage devices 226, and Internet connections 228 as can be included within the network 201.

Figure 3:
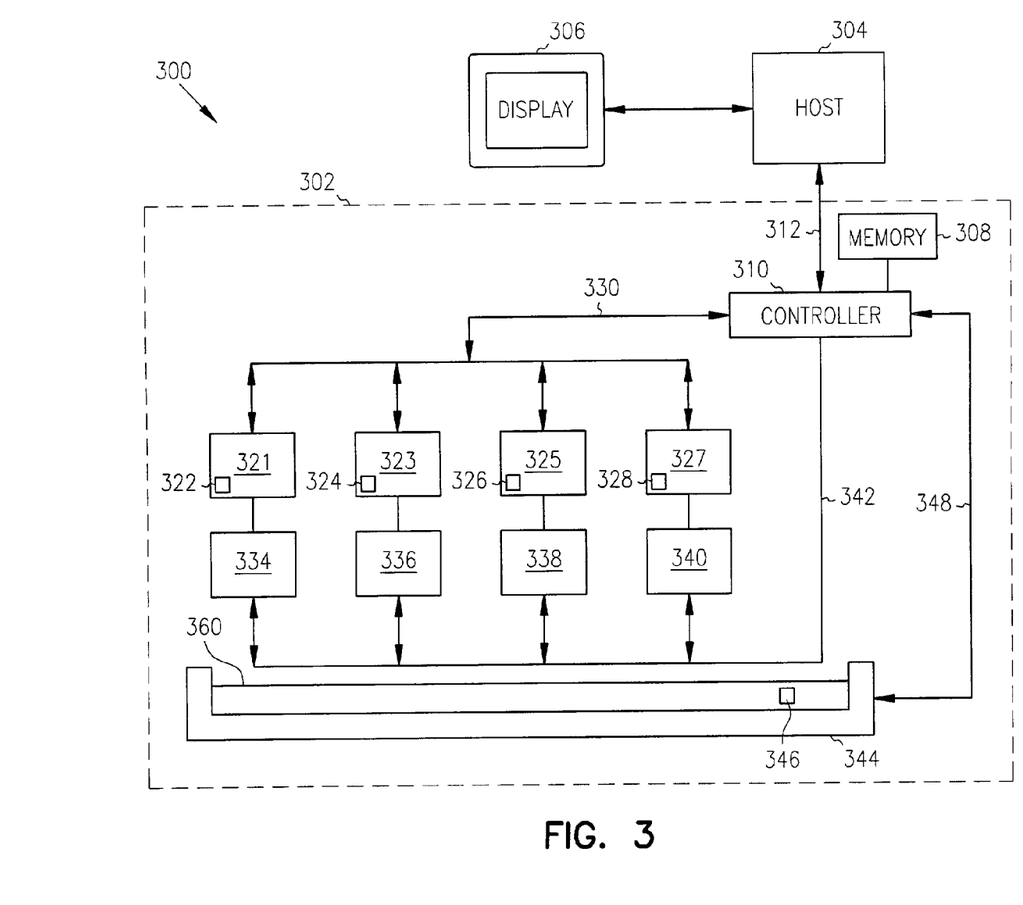
FIG. 3 is a diagram illustrating a system embodiment that includes a printer controller, a display, and a host computer.

FIG. 3 is a diagram illustrating a system 300 embodiment that includes a printing device or apparatus 302, a host computer 304, and a display 306. The printing device 302 includes a memory 308 and a print controller 310. The printing device or printer 302 includes one or more ink reservoirs 321, 323, 325 and 327 and one or more printheads 334, 336, 338 and 340 associated therewith. The controller 310 controls many aspects of the printer 302. That is, the controller 310 controls the transfer of information to ink reservoirs 321, 323, 325 and 327, as well as the control of information to and from the printheads 334, 336, 338 and 340. Information can be obtained from the memory 308 and/or elsewhere in system 300.

In some embodiments, the memory 308 includes an indication of the type of ink and the ink colors in the various reservoirs 321, 323, 325 and 327. The memory 308 can also contain information as to the levels of ink within the various reservoirs 321, 323, 325 and 327. In the embodiment of FIG. 3, a number of fluid level sensors 322, 324, 326, and 328 are shown with each fluid sensor associated with one of the ink reservoirs 321, 323, 325 and 327. The invention however is not limited to this particular sensor configuration and other sensor arrangements, suitable for carrying out various aspects described herein, are within the scope of the invention. In the embodiment of FIG. 3, the fluid level sensors 322, 324, 326, and 328 are located to monitor an ink level in each of the various reservoirs. The fluid level determined by the fluid level sensors 322, 324, 326 can be placed into memory 308. Electrical contacts associated with each of the reservoirs 321, 323, 325 and 327 can receive and transmit signals between the reservoirs 321, 323, 325 and 327 and the controller 310 over conductive paths 330.

In the various embodiments, the controller 310 can selectively activate each printhead 334, 336, 338 and 340 to eject or deposit ink from the respective reservoirs 321, 323, 325 and 327 onto a print media 360. The printheads 334, 336, 338 and 340 can be controlled by signals from the controller 310 over conductive paths 342. The printheads 334, 336, 338 and 340 are also capable of providing signals to the controller 310. In some embodiments, the signals provided to the controller 310 are feedback signals such as in a feedback control loop.

In the embodiment of FIG. 3, a conductive path 348 is provided to a media handling device 344, such as a paper tray, for controlling media transport. As one of ordinary skill in the art will appreciate upon reading this disclosure, other conductive paths will exist to control additional operations such as the movement of the carriage 124 shown in FIG. 1. Such details are not provided herein so as not to obscure the invention.

In one embodiment, attached or associated with the media handling device 344 is a media type sensor 346. The media type sensor 346 can sense the type of media 360 associated with a particular print job. In various embodiments, the media type sensor includes a sensor 346 for reading indicia. The indicia that can be read with various media type sensors 346 include bar codes, labels, switch bumps, magnetically readable media, radio frequency signals, read-only chips, and other indicia.

As shown in FIG. 3, the controller 310 is also communicatively coupled to a host computer 304. The host computer 304 can include a remote terminal 202 as shown in FIG. 2. The host computer 304 is communicatively coupled to the display device 306 via conductive path 313. As discussed in more detail below, the display device 306 can provide a print preview that reflects a consumable availability status. The host computer 304 provides image information, such as a print instruction set, to the controller 310 by way of a data link or conductive path 312. In this disclosure, conductive paths or data links are intended to include any one or combination of signal mediums such as hardwired electrical links, radio frequency links, infrared links, optical links and the like. Thus, data link 312 transfers information between the host computer 304 and the printing device 302.

Various parameters can be stored in the storage device or memory 308, including the actual count of ink drops emitted from a particular printhead 334, 336, 338 and 340, data associated with an ink reservoir or container 321, 323, 325 and 327, as well as the ink type and color, the container size, the age of the ink, the printer model or identification number, and cartridge usage information. Information on the print media 360 can also be stored within the memory. In some embodiments, information on the print media 360 is obtained from the media type sensor 346. A print command or print instruction set sent from the host computer 304 to the controller 310 will contain information on a selected print media type for a particular print job. In some embodiments, where multiple print media trays are associated with a printer, the print command will contain information designating a particular tray from which to select print media for a given print job. In some embodiments, information in the print command relating to a resolution setting will be used indicate the type of print media to be used for a particular print job. For example, a resolution setting of 2400 dots per inch (dpi) can be used to indicate that a high-quality photo type print media is to be used for a particular print job. In some embodiments, information in the print command includes a printer setting such as standard or economy mode.

The controller 310 is an information handling system and can be either a microprocessor or a dedicated controller. The controller 310 is capable of detecting the colors contained in each of the reservoirs 321, 323, 325 and 327. In some embodiments, the controller 310 detects a color from indicia associated with the reservoirs 321, 323, 325 and 327. The indicia can be any type of readable indicator including bar codes, switch bumps, magnetically readable media, radio frequency signals, read-only chips and the like. In some embodiments, the controller detects the color contained in each of the reservoirs 321, 323, 325 and 327 from a location of a cartridge containing the ink reservoir in the print device 302. In some embodiments, data associated with ink in each of the reservoirs 321, 323, 325 and 327 is obtained through electrical contacts associated with the cartridge or reservoir 321, 323, 325 and 327. A print command or print instruction set sent from the host computer 304 to the controller 310 can contain information setting the parameters for a particular print job, e.g. color information, resolution information, print media, and the like.

Figure 4:
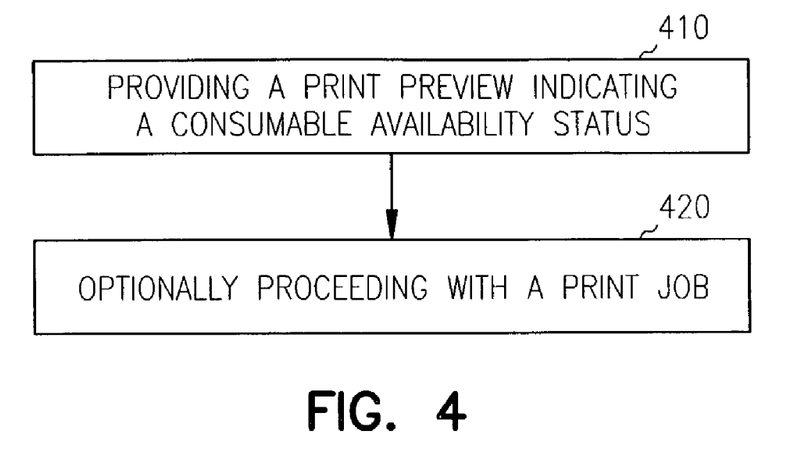
FIG. 4 is a flow chart illustrating a method according to an embodiment of the invention.
Figure 5:
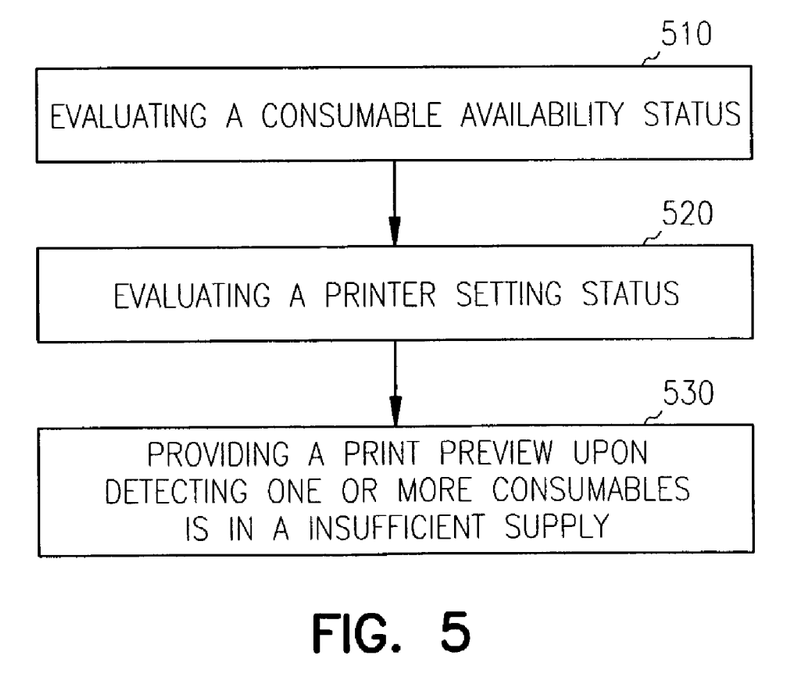
FIG. 5 is a flow chart illustrating a method according to an embodiment of the invention.
Figure 6:
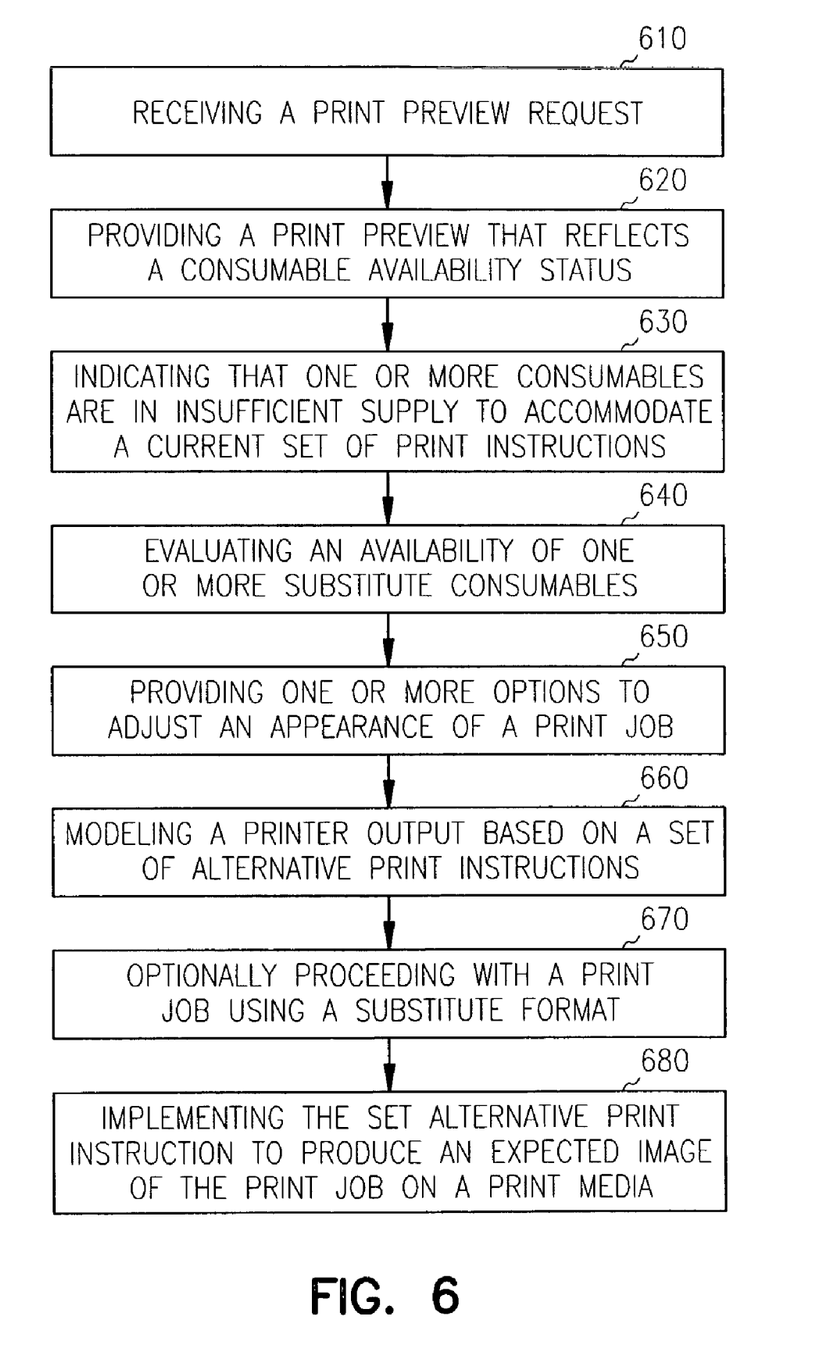
FIG. 6 is a flow chart illustrating a method according to an embodiment of the invention.

FIGS. 4–6 are flow charts illustrating various method aspects of the invention. As one of ordinary skill in the art will understand upon reading and understanding this disclosure, the methods includes methods which can be performed by software, application modules, and computer executable instructions, operable on a system such as shown in FIGS. 2 and 3, to achieve the same. The invention, however, is not limited to any particular operating environment or software written in a particular programming language.

FIG. 4 is a flow chart illustrating a method according to an embodiment of the invention. In FIG. 4, the method includes providing a print preview indicating a consumable availability status at block 410. Providing the print preview indicating a consumable availability status includes illustrating an appearance a print job will have based on a shortage of one or more consumables. Illustrating an appearance a print job will have based on a shortage of one or more consumables includes illustrating an appearance in an absence or insufficient supply of one or more inks. For example, if a printer is out of yellow toner, a print preview will reflect the absence of yellow in the way a preview image is displayed, e.g. no yellow will be present. Illustrating the appearance of the print job will also reflect the printer setting. As one of ordinary skill in the art will appreciate upon reading this disclosure, a display is used for illustrating the appearance of the print job. In FIG. 4, the method includes optionally proceeding with a print job at block 420, including optionally proceeding with a print job using a substitute format. In some embodiments, using a substitute format includes performing an action selected from substituting a consumable and changing a print setting.

FIG. 5 is a flow chart illustrating a method according to an embodiment of the invention. In FIG. 5, the method includes evaluating a consumable availability status at block 510. At block 520, the method includes evaluating a printer setting status. Evaluating a consumable availability status will include assessing an amount and a type of ink as well as a print media type for a print job based on information in a print command. Information in the print command can be processed along with information associated with the status of other consumables. At block 530, the method includes providing a print preview upon detecting one or more consumables is in an insufficient supply. In some embodiments, evaluating a consumable availability status includes determining an availability of one or more substitute consumables.

FIG. 6 is a flow chart illustrating a method according to an embodiment of the invention. In FIG. 6, the method includes receiving a print preview request at block 610. At block 620, the method includes providing a print preview that reflects a consumable availability status. A display is used for providing the print preview. At block 630, the method includes indicating that one or more consumables are in an insufficient supply to accommodate a current set of print instructions. In some embodiments of the invention, the method involves recommending a substitute consumable combination. This is shown in FIG. 6 in which the method includes evaluating an availability of one or more substitute consumables at block 640 and providing one or more options to adjust an appearance of a print job at block 650.

In various embodiments, recommending a substitute consumable combination includes modeling, such as via a print preview on a display, a printer output based on an alternative, modified or reconfigured set of print instructions as shown at block 660. Modeling a printer output based on an alternative set of print instructions can include modeling a printer output with a different color gamut selection, a different resolution setting, a different print media, a different printer setting, and the like.

Thus, providing one or more options to adjust the appearance of a print job includes providing a different resolution option, a different printing mode option, a different color gamut selection, a different print media, a different printer setting and the like. This provision is in contrast to having to replace the one or more consumables which are in insufficient supply before printing, e.g. replacing toner/ink or print media, or having to select a different printer although such actions can be performed as well. In this manner the various embodiments include optionally proceeding with a print job using a substitute format as shown in block 670.

In block 680, the method includes implementing an alternative, modified or reconfigured set of print instructions to produce an expected image of the print job on print media. Thus, optionally proceeding with a print job can include selecting a different resolution option, a different printing mode option, a different color gamut selection, a different print media, a different printer setting, simplex or duplex settings and the like. Additionally, optionally proceeding with the print job can include executing or performing image enhancing algorithms such as halftoning and dithering.

Figure 7:
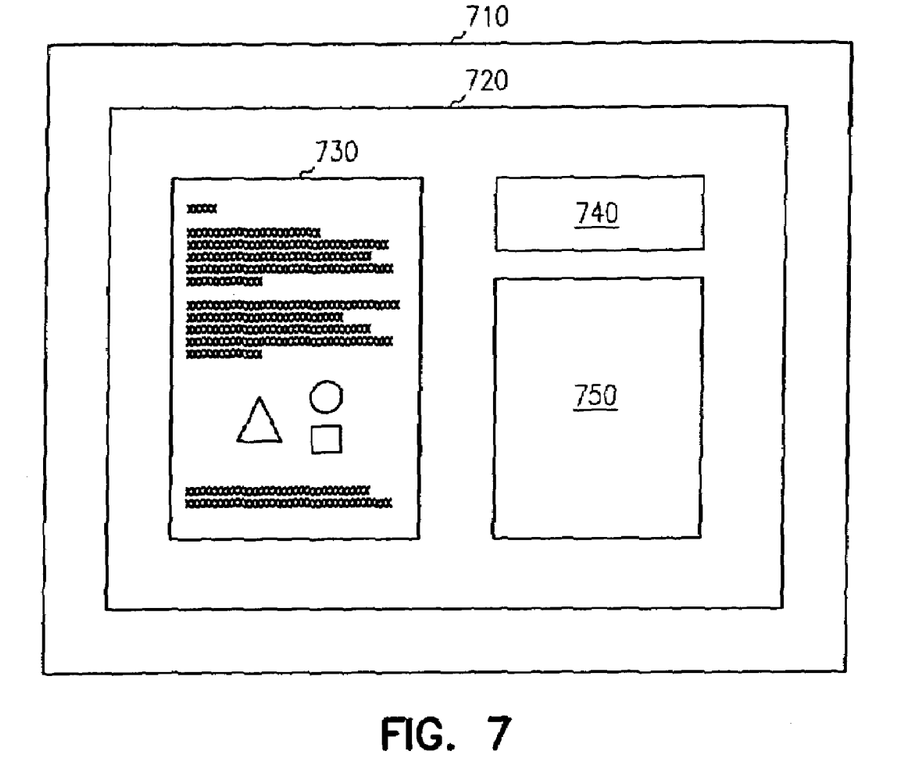
FIG. 7 is a print display embodiment.

FIG. 7 illustrates an embodiment of a display 710 as can be included within systems 200 and 300 of FIGS. 2 and 3. As described above, methods for the various embodiments of the invention can be performed by software, application modules, and computer executable instructions, operable on such systems. In FIG. 7, a display 710 is provided. A screen 720 is shown within the display 710. The display 710 can include a cathode ray tube, a flat panel display with an active matrix array of thin film transistors, or other suitable user interfaces of the like. Applications running on a system are viewable on the screen 720 of the display. One or more applications can be viewable at one time such as in a Windows operating environment. Display 710 is used to provide a print preview illustrating an actual appearance a print job will have in view of a consumable availability status. As described herein, the actual appearance reflected in the print preview will represent an absence or insufficient supply of one or more consumables. In the embodiment of FIG. 7, a print preview 730 is shown on screen 720. As one of ordinary skill in the art will appreciate upon reading this disclosure, the print preview 730 can be illustrated on screen 720 in one of a number of different formats such as draft mode, high density and/or full page mode and the like. However, in contrast to general print preview illustrations, print preview 730 will illustrates an actual appearance a print job will have in view of a consumable availability status and account for an absence or insufficient supply of one or more consumables.

In some embodiments, the print preview 730 is provided automatically when an absence or insufficient supply of one or more consumables is detected. In some embodiments a print preview request is received prior to illustrating the print preview 730 on screen 720. The print preview request can be generated from input signals entered to an input device associated with a remote terminal, host computer or otherwise as the same are understood in the art of computing devices.

In the various embodiments, the display 710 can be used to recommend one or more options for a substitute format when one or more consumables contained in a set of print instructions is unavailable or is in an insufficient supply. In the embodiment of FIG. 7, one or more options 740 such as one or more alternative/substitute consumables or substitute combination of consumables are provided on the screen 720. In various embodiments, the substitute format preview 750 is illustrated on screen 720 which models what a printer output will look like using the one or more substitute consumables or substitute combination of consumables.

Thus, in the various embodiments, a user is afforded the opportunity to view, evaluate, and even act upon the actual appearance a printed document will have before printing, while taking into account the available consumables and printer settings.

Figure 8:
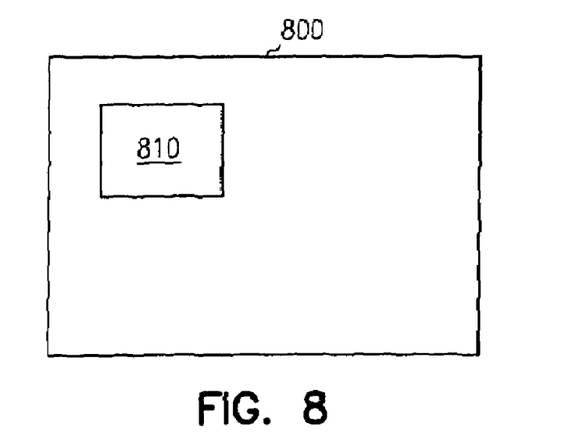
FIG. 8 is a diagram illustrating a computer readable medium and associated instruction set according to an embodiment of the invention.

FIG. 8 is a schematic diagram illustrating a computer-readable medium 800 and an associated instruction set 810, according to an embodiment of this invention. The computer-readable medium 800 can be any number of computer-readable media including a floppy drive, a hard disk drive, a network interface, magnetic medium, an rf signal, a carrier wave, an interface to the internet, or the like. The computer-readable medium can also be a hard-wired link for a network or be an infrared or radio frequency carrier. The instruction set 810 can be any set of instructions that are executable by an information handling system associated with the printer instruction processing discussed. For example, the instruction set can include an instruction set for performing the methods discussed with respect to FIGS. 4–6. Other instruction sets can also be placed on the computer-readable medium 800.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

The invention claimed is:

1. A method for print previewing, comprising:
   receiving a print preview request; and
   responsive to the request, providing a print preview that reflects an appearance a print job will have based on a consumable availability status, the print preview illustrating an appearance the print job will have based on a shortage of one or more consumables without use of any substitute consumables.

2. The method of claim 1, wherein providing a print preview that reflects a consumable availability status includes indicating that one or more consumables are in an insufficient supply to accommodate a set of print instructions, and is operable to indicate where in a print job the one or more consumables will be exhausted.

3. The method of claim 1, wherein providing a print preview that reflects a consumable availability status includes evaluating an availability of one or more substitute consumables.

4. The method of claim 1, wherein providing a print preview that reflects a consumable availability status includes determining whether to proceed with a print job upon indication that one or more consumables are in an insufficient supply, and wherein proceeding with a print job includes using a substitute format.

5. The method of claim 4, wherein proceeding with a print job using a substitute format includes performing an action selected from the group of substituting a consumable and changing a print setting.

6. A method for print previewing, comprising:
receiving a print preview request for a print job;
illustrating an appearance the print job will have based on a shortage of one or more consumables if no adjustments to the print job are made to compensate for the shortage; and
providing one or more options to adjust the appearance of the print job.

7. The method of claim 6, wherein illustrating an appearance the print job will have based on a shortage of one or more consumables includes illustrating the appearance with an absence of a color required by the print job.

8. The method of claim 6, wherein providing one or more options to adjust the appearance of the print job includes providing a different density option.

9. The method of claim 6, wherein providing one or more options to adjust the appearance of the print job includes providing a different printing mode option.

10. The method of claim 6, wherein providing one or more options to adjust the appearance of the print job includes providing a different printer option.

11. A computer readable medium comprising computer-executable instructions for causing a computer to perform a method, the method comprising:
evaluating a consumable availability status for a printer;
evaluating a setting status for the printer; and
providing a print preview reflecting an appearance of a print job based on a consumable associated with the printer upon detecting that the consumable is in an insufficient supply to print the print job, the appearance reflecting the insufficient supply of the consumable and not reflecting a modification to compensate for the insufficient supply.

12. The medium of claim 11, wherein the method includes recommending a substitute consumable combination.

13. The medium of claim 11, wherein the method includes modeling a printer output based on an alternative set of print instructions for the print job.

14. The medium of claim 13, wherein modeling a printer output based on an alternative set of print instructions for the print job includes modeling a printer output with a different color gamut selection.

15. The medium of claim 13, wherein the method includes implementing the alternative set of print instructions for the print job.

16. The medium of claim 11, wherein providing a print preview includes providing a print preview which accurately reflects a density setting.

17. A system, comprising:
a host computer;
a display associated with the host computer;
a printer having one or more sensors, the printer to receive a print job from the host computer;
means for previewing the print job in a manner that demonstrates an appearance the print job will have based on a consumable availability status, the appearance reflecting a shortage of a consumable to print the print job and not reflecting an adjustment to compensate for the shortage; and
means for adjusting the appearance of the print job so as to compensate for the shortage.

18. The system of claim 17, wherein the means for previewing the print job includes software embodied on a computer readable medium operable to represent a printer setting.

19. The system of claim 17, wherein the means for previewing the print job includes software embodied on a computer readable medium operable to represent an insufficient color availability.

20. The system of claim 17, wherein the means for adjusting the appearance of the print job includes software embodied on a computer readable medium operable to select a different density.

21. The system of claim 17, wherein the means for adjusting the appearance of the print job includes software embodied on a computer readable medium operable to select a different color gamut.

22. The system of claim 17, wherein the means for adjusting the appearance of the print job includes software embodied on a computer readable medium operable to select a different print media.

23. The system of claim 17, wherein the means for adjusting the appearance of the print job includes software embodied on a computer readable medium operable to recommend one or more alternatives when a certain consumable is in an insufficient supply.

24. A method for printing a print job, comprising:
detecting a shortage of a required consumable needed to print the print job;
in response to the detecting, generating a print preview that illustrates an appearance of the print job that reflects the shortage of the required consumable and does not reflect any modification to compensate for the shortage of the required consumable.

25. The method of claim 24, comprising:
if no shortage of any required consumable is detected, omitting the print preview.

26. The method of claim 24, wherein the print preview indicates where in the print job the required consumable will be exhausted.

27. The method of claim 24, comprising:
performing a particular modification to compensate for the shortage of the required consumable.

28. The method of claim 27, wherein the particular modification includes substitution of an alternative consumable to replace the required consumable.

29. The method of claim 28, wherein the required consumable is a colorant.

30. The method of claim 29, wherein the alternative consumable is a different colorant.

31. The method of claim 27, wherein the particular modification includes use of a different color gamut to print the print job.

32. The method of claim 27, wherein the particular modification includes use of a different resolution setting to print the print job.

33. The method of claim 27, wherein the particular modification includes printing the print job on a different type of print medium.

34. The method of claim 27, comprising:
in response to the performing, generating a modified print preview that illustrates a modified appearance of the print job that reflects the modification to compensate for the shortage of the required consumable.

* * * * *